US006841226B2

(12) United States Patent
Dontula et al.

(10) Patent No.: US 6,841,226 B2
(45) Date of Patent: Jan. 11, 2005

(54) ETHOXYLATED ALCOHOL INTERCALATED SMECTITE MATERIALS AND METHOD

(75) Inventors: Narasimharao Dontula, Rochester, NY (US); Thomas N. Blanton, Rochester, NY (US); Debasis Majumdar, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 14 days.

(21) Appl. No.: 10/011,040

(22) Filed: Nov. 13, 2001

(65) Prior Publication Data

US 2003/0099815 A1 May 29, 2003

(51) Int. Cl.⁷ .............................. B32B 7/02; G03C 8/00; G03C 11/12; C08K 3/34
(52) U.S. Cl. .................... 428/195.1; 428/212; 430/201; 430/256; 524/449
(58) Field of Search .............................. 428/195.1, 212, 428/195; 430/201, 256; 524/449

(56) References Cited

U.S. PATENT DOCUMENTS

| 4,739,007 | A |  | 4/1988 | Okada et al. |
| 4,810,734 | A |  | 3/1989 | Kawasumi et al. |
| 4,894,411 | A |  | 1/1990 | Okada et al. |
| 5,102,948 | A |  | 4/1992 | Deguchi et al. |
| 5,164,440 | A |  | 11/1992 | Deguchi et al. |
| 5,164,460 | A |  | 11/1992 | Yano et al. |
| 5,248,720 | A |  | 9/1993 | Deguchi et al. |
| 5,804,613 | A |  | 9/1998 | Beall et al. |
| 5,837,763 | A |  | 11/1998 | Ferraro et al. |
| 5,854,326 | A |  | 12/1998 | Sakaya et al. |
| 5,880,197 | A |  | 3/1999 | Beall et al. |
| 5,891,611 | A |  | 4/1999 | Majumdar et al. |
| 6,034,163 | A |  | 3/2000 | Barbee et al. |
| 6,296,983 | B1 | * | 10/2001 | Gula et al. ................. 430/201 |
| 6,436,604 | B1 | * | 8/2002 | Bourdelais et al. ......... 430/256 |

FOREIGN PATENT DOCUMENTS

| GB | 2 365 872 A | 2/2002 |
| WO | 93/04118 | 3/1993 |
| WO | 99/32403 | 7/1999 |

OTHER PUBLICATIONS

A. Okada et al., Polym Prep., 1987, vol. 28, pp. 447–448.
Rachel Levy and C.W. Francis, Journal of Colloid And Interface Science, Mar. 1975, vol. 50 (3), 442–450.
D.J. Greenland, Journal of Colloid Science, vol. 18, 1963, pp. 647–664.
Richard A. Vaia et al., New Polymer Electrolyte Nanocomposites: Melt intercalation of polyethyleneoxide in mica type silicates, Advanced Materials, 7(2), 1995, pp. 154–156.
V. Mehrotra, E.P. Giannelis, Solid State Communications, 1991, vol. 77, No. 2, pp. 155–158.
Co–pending USSN 10/008,810, Majumdar et al., *Smectite Clay Intercalated With Polyether Block Polyamide Copolymer* (D–82857).
Co–pending USSN 10/006,545, Nair et al., *Polyester Nanocomposites* (D–82858).
Co–pending USSN 10/008,428, Dontula et al., *Article Utilizing Block Copolymer Intercalated Clay* (D–82589).

* cited by examiner

*Primary Examiner*—Bruce Hess
*Assistant Examiner*—L Ferguson
(74) *Attorney, Agent, or Firm*—Lynne M. Blank

(57) ABSTRACT

The invention relates to an article comprising ethoxylated alcohol wax intercalated in smectite clay. Embodiments of the invention comprise a sheet or an imaging member comprising an image layer and at least one layer comprising ethoxylated alcohol wax intercalated in smectite clay. The invention comprises a method of forming intercalated clay by providing smectite clay and combining the clay with ethoxylated alcohol wax and heating the mixture to above the softening point of the wax. The method further includes combining the intercalated clay with a polymer.

9 Claims, No Drawings

ETHOXYLATED ALCOHOL INTERCALATED SMECTITE MATERIALS AND METHOD

CROSS REFERENCE TO RELATED APPLICATIONS

Reference is made to commonly assigned, co-pending U.S. patent applications:

Ser. No. 10/008,810 by Majumdar et al. filed of even date herewith entitled "Smectite Clay Intercalated with Polyether Block Polyamide Copolymer"; and Ser. No. 10/006,545 by Nair et al., filed of even date herewith entitled "Polyester Nanocomposites", the disclosures of which are incorporated herein.

Ser. No. 10/008,428 by Dontula et al., filed of even date herewith entitled "Article Utilizing Block Copolymer Intercalated Clay", the disclosures of which are incorporated herein.

FIELD OF THE INVENTION

This invention relates to improved smectite materials. In a preferred form it relates to a method of intercalation and compatibilization of smectite clay in thermoplastics. The invention also provides an improved base for imaging materials.

BACKGROUND OF THE INVENTION

The need for having a thinner and stiffer base for imaging products is well recognized. In addition to providing cost advantage, thinner supports can fulfill many other criteria. For example, in motion picture and related entertainment industry, thinner photographic base allows for longer film footage for the same sized reels. However, a reduction in thickness of the base typically results in a reduction in stiffness, which can have detrimental effects in terms of curl, transport, and durability. For display materials, such as photographic papers, it is desirable that the paper be light in weight and flexible for some applications. For instance, when the photographs must be mailed or used as a laminating material, it is desirable that the materials be light in weight. When stored in albums, reduced thickness of the paper will minimize undesirable bulk. For some uses such as for stand up display and to convey a sense of value, it is desirable that the photographs have a heavy stiff feel. It would be desirable if photographic materials could be easily produced with a variety of stiffness and caliper characteristics so that a variety of consumer desires could be easily met. Present materials have a limited ability to be varied as the thickness of the base paper and the thickness of the resin-coating on the paper are the only factors that can be varied easily. Further the cost of forming stiff paper is substantial as increase—in the amount of resin and in the thickness of paper, and/or selection of a stiffer resin and paper are expensive. In addition, the increases or decreases in caliper that are required for papers of increased or decreased stiffness lead to difficulties in handling in processing machines for formation of the photosensitive layers and in development after exposure.

It has been proposed in U.S. Pat. No. 5,244,861 to utilize biaxially oriented polypropylene in receiver sheets for thermal dye transfer. It has been proposed in U.S. Pat Nos. 5,866,282; 5,874,205; 5,888,643; 5,888,683 to utilize biaxially oriented polyolefin sheets for photographic supports through lamination on to a paper base.

Still there is a need in the industry to develop suitable imaging materials which can be conveniently and economically incorporated in imaging supports with appreciable improvement in stiffness, so that thinner caliper can be achieved without sacrificing any desirable characteristics of the support.

Recently, nanocomposite materials prepared using smectite clays have received considerable interest from industrial sectors, such as the automotive industry and the packaging industry, for their unique physical properties. These properties include improved heat distortion characteristics, barrier properties, and mechanical properties. The related prior art is illustrated in U.S. Pat. Nos. 4,739,007; 4,810,734; 4,894,411; 5,102,948; 5,164,440; 5,164,460; 5,248,720, 5,854,326, 6,034,163. However, the use of these nanocomposites in imaging materials for stiffer and thinner support has not been recognized.

In order to obtain stiffer polymeric supports using smectite clays, the clays need to be intercalated or exfoliated in the polymer matrix. There has been a considerable effort put towards developing methods to intercalate the smectite clays and then compatibilize with thermoplastic polymer matrix. This is because the clay host lattice is hydrophilic, and it must be chemically modified to make the platelet surfaces organophilic in order to allow it to be incorporated in the polymer matrices. To obtain the desired polymer property enhancements, all the intercalation techniques developed so far are batch processes, time consuming and lead to increasing the overall product cost. There are two major intercalation approaches that are generally used—intercalation of a suitable monomer followed by polymerization (known as in-situ polymerization, see A. Okada et. Al., *Polym Prep*. Vol. 28, 447, 1987) or monomer/polymer intercalation from solution. Polyvinyl alcohol (PVA), polyvinylpyrrolidone (PVP) and polyethylene oxide (PEO) have been used to intercalate the clay platelets with marginal success. As described by Levy et. al, in "Interlayer adsorption of polyvinylpyrrolidone on montmorillonite", *Journal of Colloid and Interface Science*, Vol 50 (3), 442, 1975, attempts were made to sorb PVP between the monoionic montmorillonite clay platelets by successive washes with absolute ethanol, and then attempting to sorb the PVP by contacting it with 1% PVP/ethanol/water solutions, with varying amounts of water. Only the Na-montmorillonite expanded beyond 20 Å basal spacing, after contacting with PVP/ethanol/water solution. The work by Greenland, "Adsorption of polyvinyl alcohol by montmorrilonite", *Journal of Colloid Science*, Vol. 18, 647–664 (1963) discloses that sorption of PVA on the montmorrilonite was dependent on the concentration of PVA in the solution. It was found that sorption was effective only at polymer concentrations of the order of 1% by weight of the polymer. No further effort was made towards commercialization since it would be limited by the drying of the dilute intercalated layered materials. In a recent work by Richard Vaia et.al., "New Polymer Electrolyte Nanocomposites: Melt intercalation of polyethyleneoxide in mica type silicates", *Adv. Materials*, 7(2), 154–156, 1995, PEO was intercalated into Na-montmorillonite and Li-montmorillonite by heating to 80° C. for 2–6 hours to achieve a d-spacing of 17.7 Å. The extent of intercalation observed was identical to that obtained from solution (V. Mehrotra, E. P. Giannelis, *Solid State Commun.*, 77, 155, 1991). Other, recent work (U.S. Pat. No. 5,804,613) has dealt with sorption of monomeric organic compounds having at least one carbonyl functionality selected from a group consisting of carboxylic acids and salts thereof, polycarboxylic acids and salts thereof, aldehydes, ketones and mixtures thereof. Similarly U.S. Pat. No. 5,880,197 discusses the use of an intercalant monomer that contains an amine or amide functionality or mixtures thereof. In both these patents and other patents issued to the same group the intercalation is performed at very dilute clay concentrations in an intercalant carrier like water. This leads to a necessary and costly drying step, prior to intercalates being dispersed in a polymer. Disclosed in WO 93/04118 is the intercalation process based on adsorption of a silane coupling agent or an onium cation such as a quaternary ammonium compound having a reactive group that is compatible with the matrix polymer.

There are difficulties in intercalating and dispersing smectite clays in thermoplastic polymers. This invention provides a technique to overcome this problem. It also provides an article with improved dispersion of smectite clays that can be incorporated in a web.

SUMMARY OF THE INVENTION

It is an object of the invention to provide intercalated smectite clay. It is another object to provide improved dispersion of the said smectite clays in a thermoplastic polymer. It is a further object to provide imaging support materials comprising such intercalated smectite clays with improved physical properties.

These and other objects of the invention are accomplished by an article comprising oxylated alcohol wax preferably ethoxylated alcohol wax intercalated in smectite clay. An embodiment of the invention comprises an imaging member comprising an image layer and at least one layer comprising ethoxylated alcohol wax intercalated in smectite clay. The invention further comprises a method of forming intercalated clay comprising providing smectite clay and combining said clay with ethoxylated alcohol wax and heating the mixture to above the softening point of the wax. The method further includes the addition of a polymer to the intercalated clay. Other advantages will be apparent from the detailed description below.

DETAILED DESCRIPTION OF THE INVENTION

The invention provides an easy, low cost method to intercalate smectite clays and subsequent dispersion in thermoplastics. The invention also provides an article with enhanced stiffness. The invention has numerous advantages. One advantage involves intercalating smectite clays with long chain oxylated alcohols preferably long chain ethoxylated alcohols. This can be done by various techniques like solid state; aqueous techniques or melt blending techniques. Another advantage is the intercalated clay is then easily dispersed into polyolefins without any further modification. In addition, this technique of intercalation and dispersion is advantageous in that it does not require any costly surface treatment which is practiced in the industry.

The present invention is an article which uses oxylated alcohol wax preferably ethoxylated alcohol wax intercalated in smectite clay. The ethoxylated alcohol wax intercalated clay may be combined with an image layer to create an imaging member. The present invention also includes a method of forming articles by adding the intercalated clay to a polymer.

Whenever used in the specification the terms set forth shall have the following meaning:

"Nanocomposite" shall mean a composite material wherein at least one component comprises an inorganic phase, such as a smectite clay, with at least one dimension in the 0.1 to 100 nanometer range.

"Plates" shall mean particles with two dimensions of the same size scale and is significantly greater than the third dimension. Here, length and width of the particle are of comparable size but orders of magnitude greater than the thickness of the particle.

"Layered material" shall mean an inorganic material such as a smectite clay that is in the form of a plurality of adjacent bound layers.

"Platelets" shall mean individual layers of the layered material.

"Intercalation" shall mean the insertion of one or more foreign molecules or parts of foreign molecules between platelets of the layered material, usually detected by X-ray diffraction technique, as illustrated in U.S. Pat. No. 5,891,611 (line 10, col.5–line 23, col. 7).

"Intercalant" shall mean the aforesaid foreign molecule inserted between platelets of the aforesaid layered material.

"Exfoliation" or "delamination" shall mean separation of individual platelets in to a disordered structure without any stacking order.

"Intercalated" shall refer to layered material that has at least partially undergone intercalation and/or exfoliation.

Organoclay" shall mean clay material modified by organic molecules.

The clay material suitable for this invention can comprise any inorganic phase desirably comprising layered materials in the shape of plates with significantly high aspect ratio. However, other shapes with high aspect ratio will also be advantageous, as per the invention. The clay materials suitable for this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, particularly useful with anionic matrix polymers, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be intercalated with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag dope $V_2O_5$, $W_{0.2}V_{28}O7$, $Cr_3O_8$, $MoO_3(OH)_2$, $VOPO_4\text{-}2H_2O$, $CaPO_4CH_3\text{—}H_2O$, $MnHAsO_4\text{—}H_2O$, $Ag_6Mo_{10}O_{33}$ and the like. Preferred clays are swellable so that other agents, usually organic ions or molecules, can intercalate and/or exfoliate the layered material resulting in a desirable dispersion of the inorganic phase. These swellable clays include phyllosilicates of the 2:1 type, as defined in clay literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred clays for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred clays include montmorillonite, hectorite and hydrotalcites, because of commercial availability of these materials.

The aforementioned smectite clay can be natural or synthetic. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the clay particles should have a lateral dimension of between 0.01 μm and 5 μm, and preferably between 0.05 μm and 2 μm, and more preferably between 0.1 μm and 1 μm. The thickness or the vertical dimension of the clay particles can vary between 0.5 nm and 10 nm, and preferably between 1 nm and 5 nm. The aspect ratio, which is the ratio of the largest and smallest dimension of the clay particles should be >10:1 and preferably >100:1 and more preferably >1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers.

The smectite clay materials, generally require treatment by one or more intercalants to provide the required interlayer swelling and/or compatibility with the matrix polymer. The resulting interlayer spacing is critical to the performance of the intercalated layered material in the practice of this invention. As used herein the "inter-layer spacing" refers to the distance between the faces of the layers as they are assembled in the intercalated material before any delamination (or exfoliation) takes place. The preferred clay materials generally include interlayer or exchangeable cations such as Na+, Ca+2, K+, Mg+2 and the like. In this state, these materials do not delaminate in host polymer melts regardless of mixing, because their interlayer spacings are usually very small (typically equal to or less than about 0.4 nm) and consequently the interlayer cohesive energy is relatively strong. Moreover, the metal cations do not aid compatibility between layers and the polymer melt. In the present invention, the smectite clays are intercalated by swelling agents, particularly ethoxylated alcohols, to increase interlayer distances to the desired extent. In general, the interlayer distance should be at least about 0.5 nm as determined by X-ray diffraction. In a preferred embodiment, the ethoxylated alcohols also ensure compatibility of the intercalated smectite clay in the polymeric matrix in order to achieve a homogenous well dispersed inorganic-organic nanocomposite.

Ethoxylated alcohols are a class of nonionic surfactants derived from very long chain, linear, synthetic alcohols. These alcohols are produced as functional derivatives of low molecular weight ethylene homopolymers. These when reacted with ethylene oxide or propylene oxide yield condensation products known as oxylated alcohols. The average chain length of the hydrocarbon portion can be between 12 and 106 carbons but is not restricted to this. It is preferably in the 26–50 carbon range.

The relative efficiency of the hydrophilic and lipophilic portion of the ethoxylated alcohol molecule is controlled by changing the starting alcohol, changing the amount of ethylene oxide, or using propylene oxide. The ethylene oxide or propylene oxide content can range from 1 to 99% by weight, preferably 10–90% by weight. Thus the surfactant chemistry can be widely tailored for use in a wide range of applications. Typically they have been used as dispersion aids for pigments in paints, coatings and inks. They have been used as mold release components for plastics, nonionic emulsifiers, emulsifiers/lubricants for textile processing and finishing. The present invention finds that oxylated alcohols, especially ethoxylated alcohols, may be used for intercalation of smectite clays. These intercalated clays are easily dispersed in commercial polyolefin polymers and the degree of intercalation produced by the ethoxylated alcohols was not found to be not reduced after dispersion.

To prepare the intercalates three different processes have been use. They are:

Intercalation Method 1

Smectite clay and oxylated alcohol wax are weighed and then combined. This mixture is heated to temperatures above the softening or melting point of the wax. Preferably the smectite clay and oxylated alcohol can be premixed before heating or the oxylated alcohol can be heated first followed by addition of clay. An alternative method is to add wax to the clay during heating. The weight ratio of clay to wax can be in the range of 0.1:99.9 to 99.9:0.1 with a preferred ratio of 1:99 to 90:10. The constituents are mixed for at least 5 minutes.

Intercalation Method 2

Weighed amounts of smectite clay and oxylated alcohol wax is combined to form a mixture with a weighed amount of water. Preferably the water is heated followed by addition of wax, followed by addition of clay. Alternatively to the heated water, clay can be added first followed by addition of wax. An additional alternative method would be to mix the clay and wax before adding to the heated water. Another method would be to add clay and wax to water then heat the mixture. This mixture is dried prior to further processing. The weight ratio of clay to wax is 0.1:99.9 to 99.9:0.1 with a preferred ratio of 1:99 to 90:10. The weight percent of solids in water is 0.1 to 99.9 with a preferred range of 0.1 to 10. The three constituents are mixed for at least 5 minutes.

Intercalation Method 3

A mixture of smectite clay and oxylated alcohol are combined in a mixing device and the mixture is heated and mixed at temperatures above the softening point of the wax. The mixing device can be a stirrer or can be a batch mixer like the Banbury. One can conduct a similar mixing using an extruder or a compounder. The weight ratio of clay to wax is 0.1:99.9 to 99.9:0.1 with a preferred ratio of 1:99 to 90:10. The weight percent of solids in water is 0.1 to 99.9 with a preferred range of 0.1 to 10. The three constituents are mixed for at least 5 minutes.

The main objective of the above discussed intercalation work is to be able to disperse the intercalate in a thermoplastic polymer matrix, preferably commercial polyolefins.

The methods used for the preparing the polymer layered nanocomposites are:

Nanocomposite Preparation Method A

The required amount of polyolefin like polyethylene is weighed and then melted in a mixing device like the Banbury. The temperatures used are at least 10° C.–15° C. above the melting point of the polymer. The weighed amount of wax is added to this melt followed by the weighed amount of clay. The three constituents are mixed for about 5 minutes. After this, the polymer clay mixture is removed from the mixing device and cooled or formed into an article.

Nanocomposite Preparation Method B

The polyolefin is added to the intercalate mixture prepared by any of the methods described above. The temperatures used for dispersing the intercalate in polyethylene is at least 10° C.–15° C. greater than its melting point.

Any method known in the art including those mentioned herein below can be utilized to form an article of the invention comprising polyolefin in the matrix polymer and the intercalated clay of the invention and other optional addenda. Such methods of formation include but are not limited to extrusion, co-extrusion with or without orientation by uniaxial or biaxial, simultaneous or consecutive stretching, blow molding, injection molding, lamination, solvent casting, coating, drawing, spinning, and the like. The article of the invention can be of any size and form, such as sheet, rod, particulate, powder, fiber, wire, tube, woven, non-woven, etc.

In a preferred embodiment, the article is a sheet. The sheet may be a multi-layered sheet with at least one layer of the sheet comprising a polymer, such as polyester or polyolefin, not containing intercalated smectite. A sheet of the present invention may be adhered to a negative-working photographic reflective print material, such as a paper sheet.

In another preferred embodiment of the invention, the article of the invention comprises the base of an imaging member. Such imaging members include those utilizing photographic, electrophotographic, electrostatographic, photothermographic, migration, electrothermographic, dielectric recording, thermal dye transfer, inkjet and other types of imaging. In a more preferred embodiment of the invention, the article of the invention comprises the base of photographic imaging members, particularly photographic paper and other display products.

The imaging member may comprise multiple layers including an image layer and at least one layer of oxylated wax, especially ethoxylated alcohol, intercalated in smectite clay. Such a layer formed by oxylated wax intercalated in smectite clay can be provided through coating operations on a suitable substrate. The image layer may contain photosensitive silver halide grains, an inkjet receiving layer or a thermal dye receiving layer.

Typical bases for imaging members comprise cellulose nitrate, cellulose acetate, polyvinyl acetate, polystyrene, polyolefins, polyethylene terephthalate, polyethylene naphthalate, polycarbonate, polyamide, polyimide, glass, natural and synthetic paper, resin-coated paper, voided polymers, microvoided polymers and microporous materials, fabric, etc. The preferred imaging base for this invention will comprise a reflective print media including resin coated paper, synthetic paper. The material of the invention comprising polyolefins and the intercalated clay can be incorporated in the base of the appropriate imaging member. In case of a multilayered imaging member, the aforementioned material of the invention can be incorporated in any one or more layers. In the present invention, the method of incorporation can include extrusion, co-extrusion, blow molding, casting, co-casting, lamination, calendering, embossing, coating, spraying, molding, and the like. The preferred methods of incorporations are extrusion, co-extrusion and coating. These methods are preferred because of their widespread use in industry, as well the technique's ability to leverage the material properties. The layers of a multi-layered sheet or imaging member of the present invention, with at least one layer of the sheet comprising a polymer not containing intercalated smectite, may be integrally connected during simultaneous extrusion.

The following examples illustrate the practice of this invention. They are not intended to be exhaustive of all possible variations of the invention. Parts and percentages are by weight unless otherwise indicated.

EXAMPLES

Examples 1–6

The following examples highlight the unexpected observation of intercalation of smectite clays using the oxylated alcohols. The smectite clays may be natural, synthetic or organically modified. The oxylated alcohols were obtained from Baker Petrolite. They are in a solid state and are sold as functionalized waxes. These varied in molecular weight, ethylene oxide content and hydroxyl number (as characterized by ASTM E222). It is found that intercalation was not sensitive to preparation method. Table 1 summarizes the experimental results obtained with synthetic clay (RDS) using intercalation method 1. The initial basal plane spacing of RDS clay in ambient conditions is at or near 13.6 Å. The data indicates that within the composition ranges used intercalation is not significantly affected by clay:wax ratio.

TABLE 1

| Clay Used | Wax Used | Ratio of Weight % Clay:Wax | Wax Molecular Weight (VPO) | Ethylene Oxide Content of Wax (%) | Basal Plane Spacing (Å) |
|---|---|---|---|---|---|
| RDS | 1139 | 1:1 | 700 | 50 | 21.6 |
| RDS | 1140 | 1:1 | 1750 | 80 | 19.4 |
| RDS | 1144 | 3:7 | 2300 | 80 | 19.3 |
| RDS | 1145 | 1:1 | 4600 | 90 | 18.3 |
| RDS | 1147 | 1:1 | 1100 | 50 | 19.7 |
| RDS | 1148 | 1:1 | 875 | 20 | 18.1 |

Examples 7–8

The examples listed in Table 2 highlight that the degree of intercalation is almost independent of the intercalation method.

TABLE 2

| Clay Used | Wax Used | Ratio of Weight % Clay:Wax | Intercalation Method | Basal Plane Spacing (Å) |
|---|---|---|---|---|
| RDS | 1144 | 3:7 | 1 | 19.3 |
| RDS | 1144 | 3:7 | 2 | 19.9 |
| RDS | 1144 | 1:1 | 3 | 20.6 |

Examples 9–10

Ethoxylated alcohol waxes were mixed with commercially obtained organically surface modified clays using intercalation method 1. The clays were obtained form Southern Clay. It is observed that the basal plane spacing significantly increased from 21 Å to 29.4 and 30.4 Å. Table 3 summarizes the experimental results.

TABLE 3

| Clay Used | Wax Used | Weight % Ratio of Clay:Wax | Wax Molecular Weight (VPO) | Ethylene Oxide Content of Wax (%) | Basal Plane Spacing (Å) |
|---|---|---|---|---|---|
| Cloisite 25A | 1144 | 2:1 | 2300 | 80 | 30.4 |
| Cloisite 25A | 1145 | 2:1 | 4600 | 90 | 29.4 |

Examples 11–12

A prepared intercalate is dispersed in low density polyethylene (Eastman Chemical Corporation 4002P). It is observed that intercalation created by the ethoxylated alcohol waxes is preserved. Table 4 summarizes the results for RDS clay and ethoxylated wax 1144 or Cloisite 25A and ethoxylated wax 1139.

TABLE 4

| Weight % Ratio of Clay:Wax:LDPE | Dispersion Method | Basal Plane Spacing (Å) |
|---|---|---|
| 5:12:83 (RDS Clay) | B | 20.3 |
| 5:12:83 (RDS Clay) | A | 20.3 |
| 5:12:83 (Cloisite 25A Clay) | B | 38.5 |

The invention has been described in detail with particular reference to certain preferred embodiments thereof, but it will be understood that variations and modifications can be effected within the spirit and scope of the invention. All the above discussed examples indicate towards a low cost intercalation and dispersion technique to manufacture polyethylene nanocomposites.

What is claimed is:

1. An imaging member comprising an image layer and at least one layer comprising ethoxylated alcohol wax intercalated in smectite clay.

2. The imaging member of claim 1 wherein said at least one layer comprising ethoxylated alcohol and smectite clay further comprises polyolefin polymer.

3. The imaging member of claim 1 wherein said ethoxylated alcohol has a chain length of between 26 and 50 carbons.

4. The imaging member of claim 1 wherein said smectite clay is synthetic clay.

5. The imaging member of claim 1 wherein said clay is organically modified.

6. The imaging member of claim 1 wherein said ethoxylated alcohol intercalated in smectite clay is dispersed in polyolefin polymer.

7. The imaging member of claim 1 wherein said image layer comprises at least one layer comprising photosensitive silver halide grains.

8. The imaging member of claim 1 wherein said image layer comprises at least one layer comprising an ink jet receiving layer.

9. The imaging member of claim 1 wherein said image layer comprises at least one layer comprising a thermal dye receiving layer.

* * * * *